United States Patent
Gehring et al.

(10) Patent No.: US 6,854,779 B2
(45) Date of Patent: Feb. 15, 2005

(54) DRIVER-ACCESSIBLE STORAGE COMPARTMENTS FOR PASSENGER VEHICLES

(75) Inventors: Thomas F. J. Gehring, Ontario (CA); Ireneusz Jankowski, Ontario (CA); Dejan Havidic, Toronto (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/696,158

(22) Filed: Oct. 29, 2003

(65) Prior Publication Data

US 2004/0135391 A1 Jul. 15, 2004

Related U.S. Application Data

(60) Provisional application No. 60/424,995, filed on Nov. 8, 2002.

(51) Int. Cl.[7] .................................................. B60R 7/06
(52) U.S. Cl. ...................... 296/37.12; 224/483; 224/926
(58) Field of Search ............................... 296/24.3, 24.4, 296/24.46, 37.1, 37.8, 37.9, 37.12; 224/281, 483, 926; 312/330.1, 310, 348.5, 271, 273

(56) References Cited

U.S. PATENT DOCUMENTS

| | | | |
|---|---|---|---|
| 5,489,054 A | * | 2/1996 | Schiff .......................... 224/281 |
| 5,823,612 A | | 10/1998 | Angelo .................... 296/37.12 |
| 6,176,534 B1 | | 1/2001 | Duncan .................... 296/37.12 |
| 6,629,716 B2 | * | 10/2003 | Shibata et al. ................ 296/70 |
| 2002/0135194 A1 | * | 9/2002 | Schwarz .................... 296/37.8 |

* cited by examiner

*Primary Examiner*—Patricia L. Engle
(74) *Attorney, Agent, or Firm*—Myers Bigel Sibley & Sajovec, P.A.

(57) ABSTRACT

A driver-accessible storage drawer is slidably mounted to an instrument panel and is movable within a cavity of the instrument panel between closed and open positions. The storage drawer comprises a floor, a front wall, a rear wall opposite the front wall, and side walls that extend between the front and rear walls in spaced-apart relationship to define a storage compartment for receiving items therein. A tray having one or more receptacles therein is slidably secured to the storage drawer and is movable between a hidden position within the instrument panel cavity and an exposed position when the storage drawer is in an open position.

48 Claims, 14 Drawing Sheets

DRIVER-ACCESSIBLE STORAGE COMPARTMENTS FOR PASSENGER VEHICLES

RELATED APPLICATION

This application claims the benefit of U.S. Provisional Application No. 60/424,995, filed Nov. 8, 2002, the disclosure of which is incorporated herein by reference in its entirety as if set forth fully herein.

FIELD OF THE INVENTION

The present invention relates generally to vehicles and, more particularly, to storage compartments for use within vehicles.

BACKGROUND OF THE INVENTION

Conventional vehicle dashboards often include a glove box for use in concealing stored items. Conventionally positioned on the passenger side of a vehicle, a glove box and contents therein can be inaccessible to a driver, particularly when the vehicle is moving. A need exists to provide storage areas closer to the driver of a vehicle. In addition, a need exists to maximize the efficiency and utilization of existing vehicle interior space without intruding on passenger space.

Vehicle dashboards typically house or contain a variety of vehicle components, such as wiring, air conditioning and/or heating ducts, and the like. As such, available space within a vehicle dashboard for storage areas may be somewhat limited, particularly space that is close to the driver.

SUMMARY OF THE INVENTION

In view of the above discussion, a driver-accessible storage drawer movably secured to a vehicle instrument panel is provided. The storage drawer is slidably mounted to the instrument panel and is movable within a cavity of the instrument panel between closed and open positions. The storage drawer comprises a floor, a front wall, a rear wall opposite the front wall, and side walls that extend between the front and rear walls in spaced-apart relationship to define a storage compartment for receiving items therein. A tray having one or more receptacles (e.g., cupholders, etc.) therein is slidably secured to the storage drawer and is movable between a hidden position within the instrument panel cavity and an exposed position when the storage drawer is in an open position.

According to embodiments of the present invention, the tray is operably connected to the storage drawer such that movement of the storage drawer from the closed position to a partially open position causes the tray to move to the exposed position. A stop may be positioned within the instrument panel cavity that is configured to maintain the tray in the exposed position as the storage drawer moves from the partially open position to a fully open position.

According to embodiments of the present invention, a user can select between automatic movement of the tray and manual movement of the tray. An actuator operably associated with the tray allows a user to selectively attach the tray to the storage drawer such that user movement of the storage drawer to an extended position causes movement of the tray to the exposed position.

According to other embodiments of the present invention, a driver-accessible storage drawer has a front wall that pivots outwardly to expose a tray having one or more receptacles (e.g., cupholders, etc.) therein.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring now to the figures, storage drawers, according to various embodiments of the present invention, that are easily accessible by both drivers and passengers, are illustrated. Although the vehicle illustrated herein is an automobile, it is understood that storage drawers according to embodiments of the present invention may be utilized in various types of vehicles including, but not limited to, automobiles, trucks, trains, airplanes, boats, etc.

Referring initially to FIGS. 1–6, a vehicle instrument panel 10 includes a central section 12 located between the driver side and passenger side of a vehicle passenger compartment 14. The illustrated instrument panel central section 12 may include numerous systems and controls (e.g., radio/CD player, heating, ventilation and air conditioning, etc.) as would be understood by one skilled in the art. Beneath the instrument panel central section 12., a slidable storage drawer 20 is provided that is movable relative to a cavity 18 in the instrument panel central section 12. The storage drawer 20 includes a floor 22, a front wall 24, a rear wall 26, and side walls 28, which define a storage compartment 30 for receiving items therein. The storage compartment 30 may also be utilized as a refuse receptacle.

The storage drawer 20 is slidably secured beneath the instrument panel central section 12 and is movable between a closed position (FIG. 1) and one or more open positions (FIGS. 2–6). The illustrated storage drawer 20 may be slidably mounted to the instrument panel central section 12, to the vehicle floor, or to another vehicle component (e.g., the vehicle firewall, etc.) and in various ways that would be understood by one skilled in the art. Various types of stops may be utilized to stop the storage drawer 20 in one or more extended positions, as would be understood by one skilled in the art. For example, one or more members may extend from the side walls 28 of the storage drawer that are configured to engage respective portions of the instrument panel central section 12 (or other portions of the instrument panel 10 or vehicle interior) when the storage drawer 20 reaches an extended position and/or to prevent the storage drawer 20 from being removed from the instrument panel 10.

In the closed position (FIG. 1), the front wall 24 is substantially flush with the instrument panel central section 12, as illustrated. Accordingly, the storage drawer 20 may appear integral with the instrument panel 10 when in the closed position. However, it is to be understood that storage drawers according to embodiments of the present invention need not be flush with an instrument panel section. Alternatively, storage drawer 20 may extend outwardly somewhat from the instrument panel central section 12 when in the closed position or may be recessed somewhat relative to the instrument panel central section 12 when in the closed position. Also, the storage drawer 20 may have various shapes and sizes and is not limited to the illustrated configuration. Moreover, multiple storage drawers 20 may be utilized in accordance with embodiments of the present invention.

Figure 1:
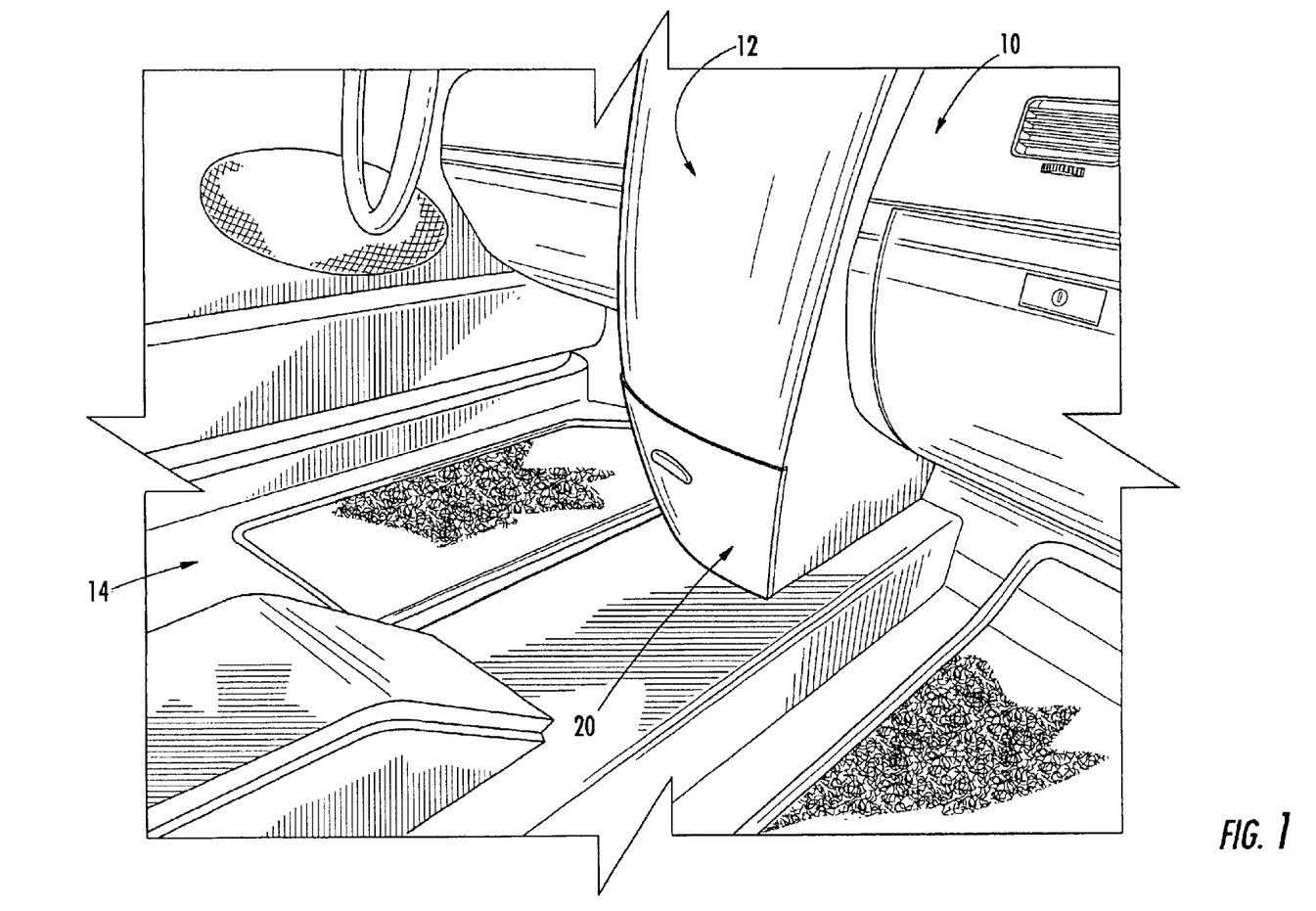
FIG. 1 is a perspective view of a driver-accessible slidable storage drawer according to embodiments of the present invention.

In the illustrated embodiment, a handle 40 extends from the front wall 24 and is configured to be grasped by a user and used to move the storage drawer 20 between open and closed positions. Handles having various shapes and configurations may be utilized in accordance with embodiments of the present invention. In addition, a handle may be integrally formed within the front wall 24. Moreover, handles may be located on the front wall 24 in various locations. Furthermore, embodiments of the present invention do not require a handle (i.e., a handle is optional).

In the illustrated embodiment, a tray 50 having one or more receptacles 52 (e.g., cupholders, etc.) therein is slidably secured to the storage drawer 20 and is movable between a hidden position within the instrument panel central section cavity 18 and an exposed position when the storage drawer 20 is in an open position. In the illustrated embodiment, the tray 50 is slidably associated with the upper edge portions 28a of the storage drawer 20.

Figure 12:
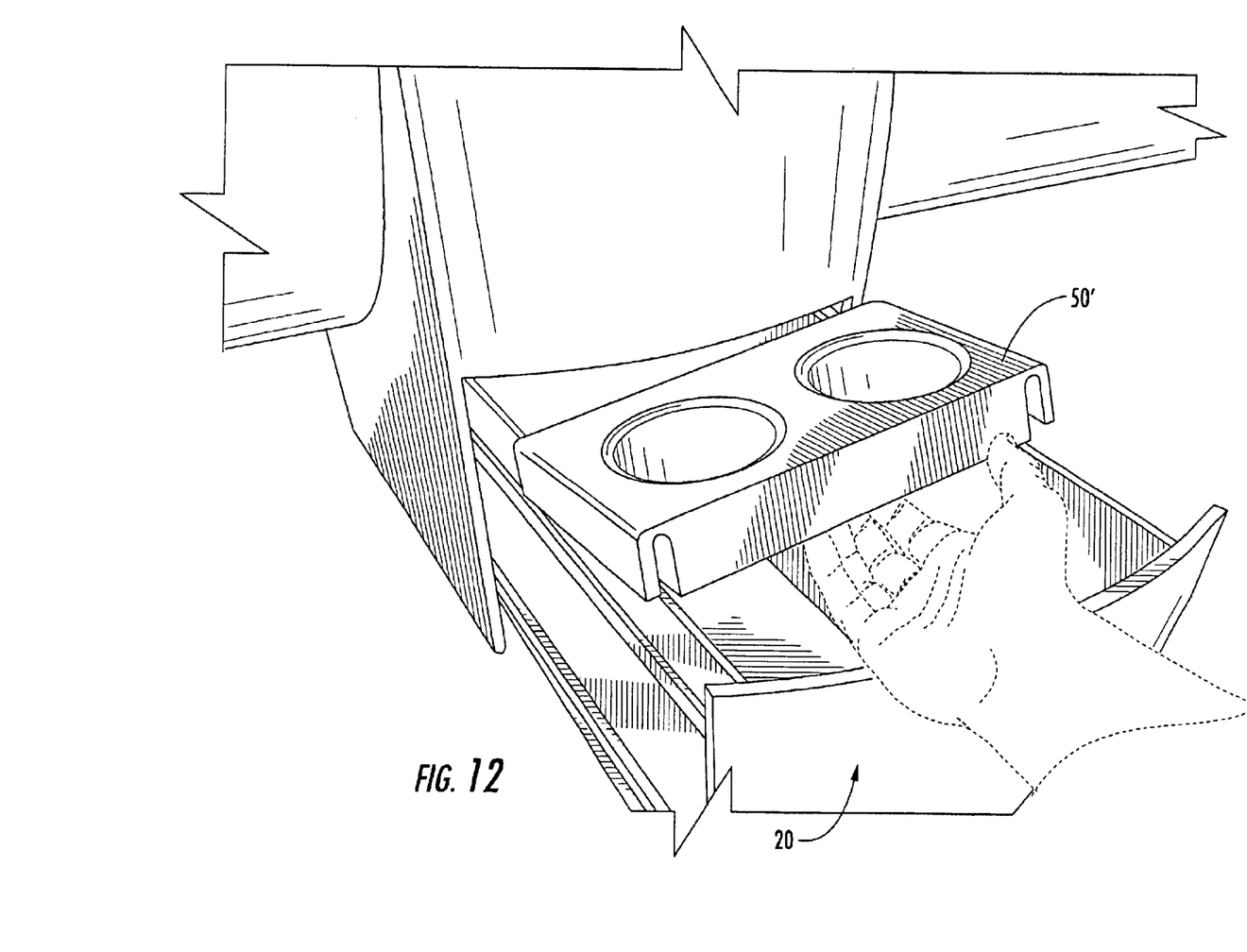

Tray 50, according to embodiments of the present invention, may have various shapes, sizes and configurations, without limitation. In addition, the tray 50 may be removable from the upper edge portions 28a of the storage drawer 20 and may be stored within the storage drawer 20 (or elsewhere) when not needed. FIG. 12 illustrates a removable tray 50' according to embodiments of the present invention.

Figure 2:
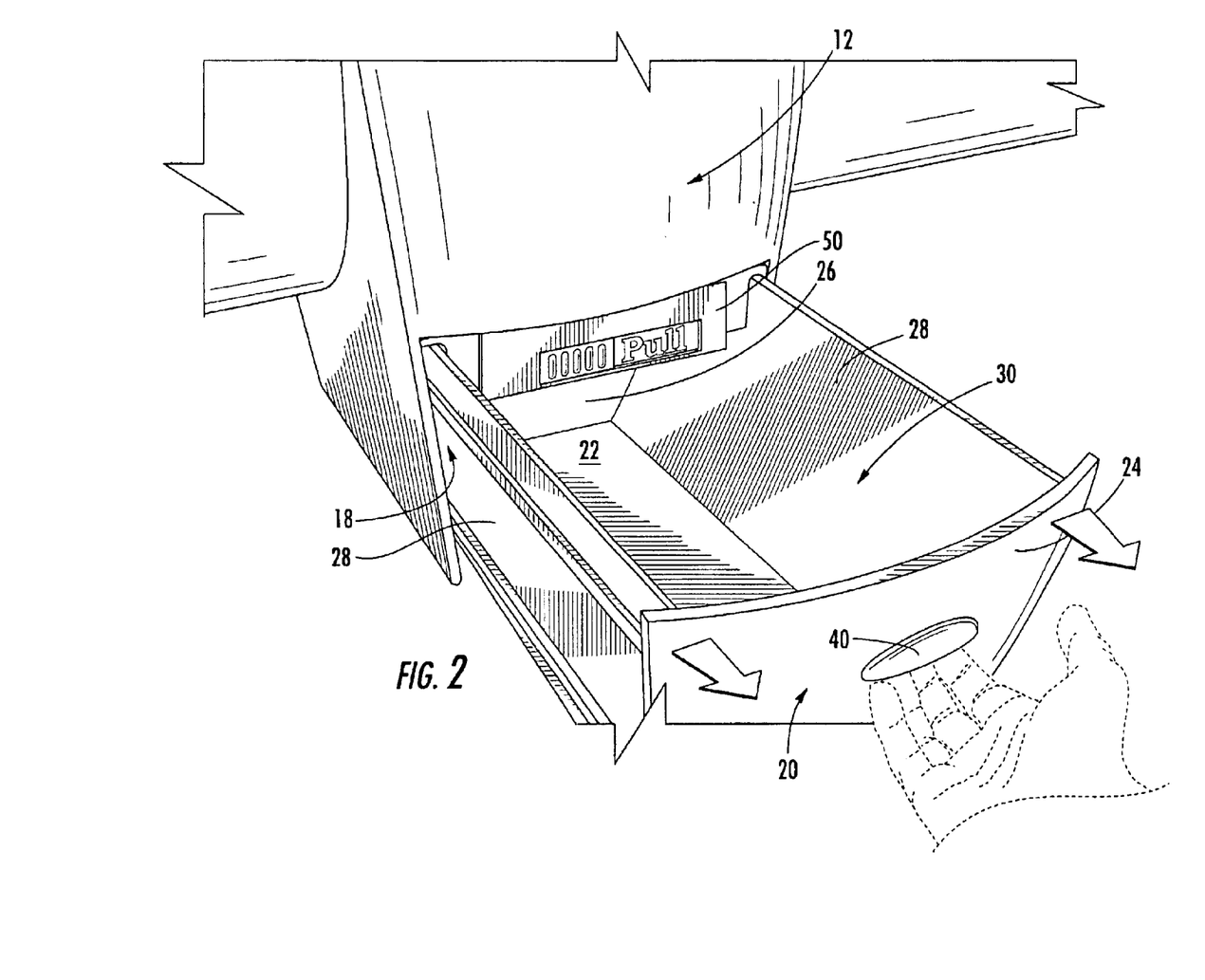
FIG. 2 illustrates the storage drawer of FIG. 1 in an open position.
Figure 3:
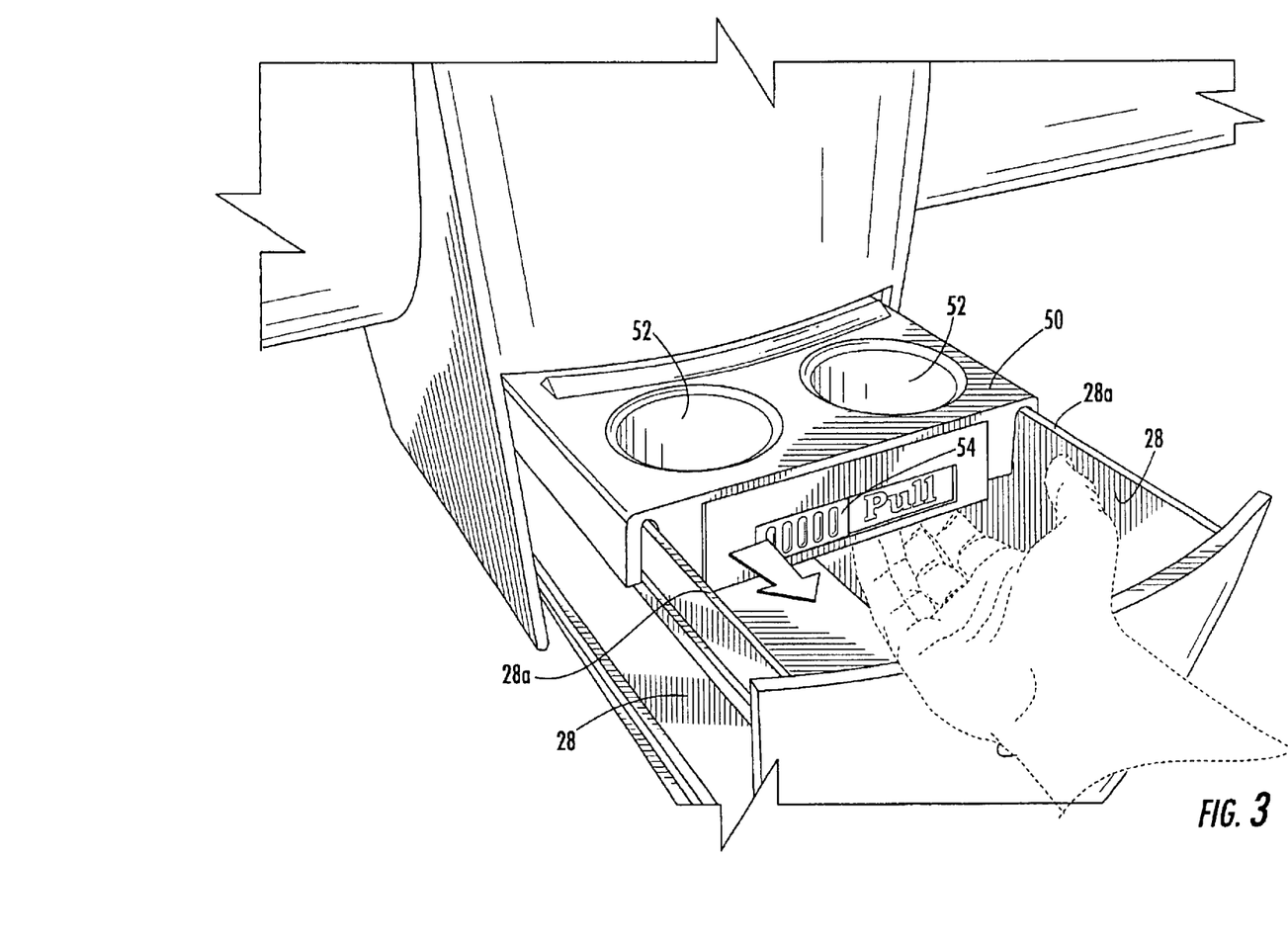
FIG. 3 illustrates a user manually pulling a tray that is slidably associated with the storage drawer of FIG. 2 into an operative position.

In the illustrated embodiment, the tray 50 is movable manually and automatically. A slider switch 54, which serves as an actuator, is operably associated with the illustrated tray 50 and allows a user to select between manual operation and automatic operation of the tray 50. In FIGS. 2–3, the slider switch 54 is in manual or "Pull" mode which allows the drawer 20 to be extended and retracted independently of the tray 50. For example, as illustrated in FIG. 2, a user has extended the drawer 20 to an open position and the tray 50 has remained in a hidden position within the instrument panel cavity 18. In FIG. 3, the user pulls the tray 50 out from the instrument panel cavity 18 to an operative position wherein articles can be placed within the receptacles 52.

Figure 4:
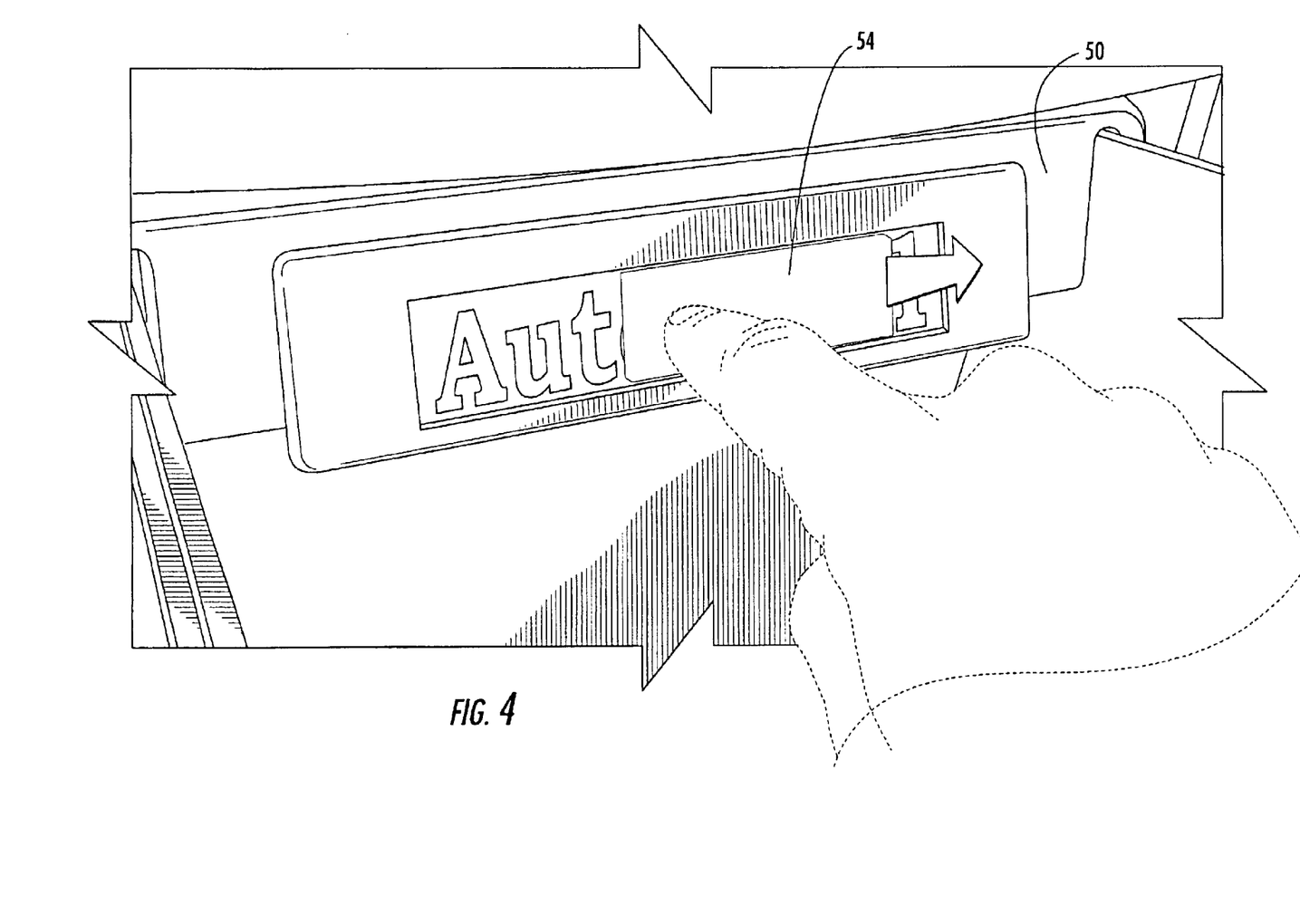
FIG. 4 is an enlarged perspective view of a slider switch operably associated with the tray and storage drawer of FIG. 2 that allows a user to select between manual and automatic pulling to the tray to an operative position.
Figure 5:
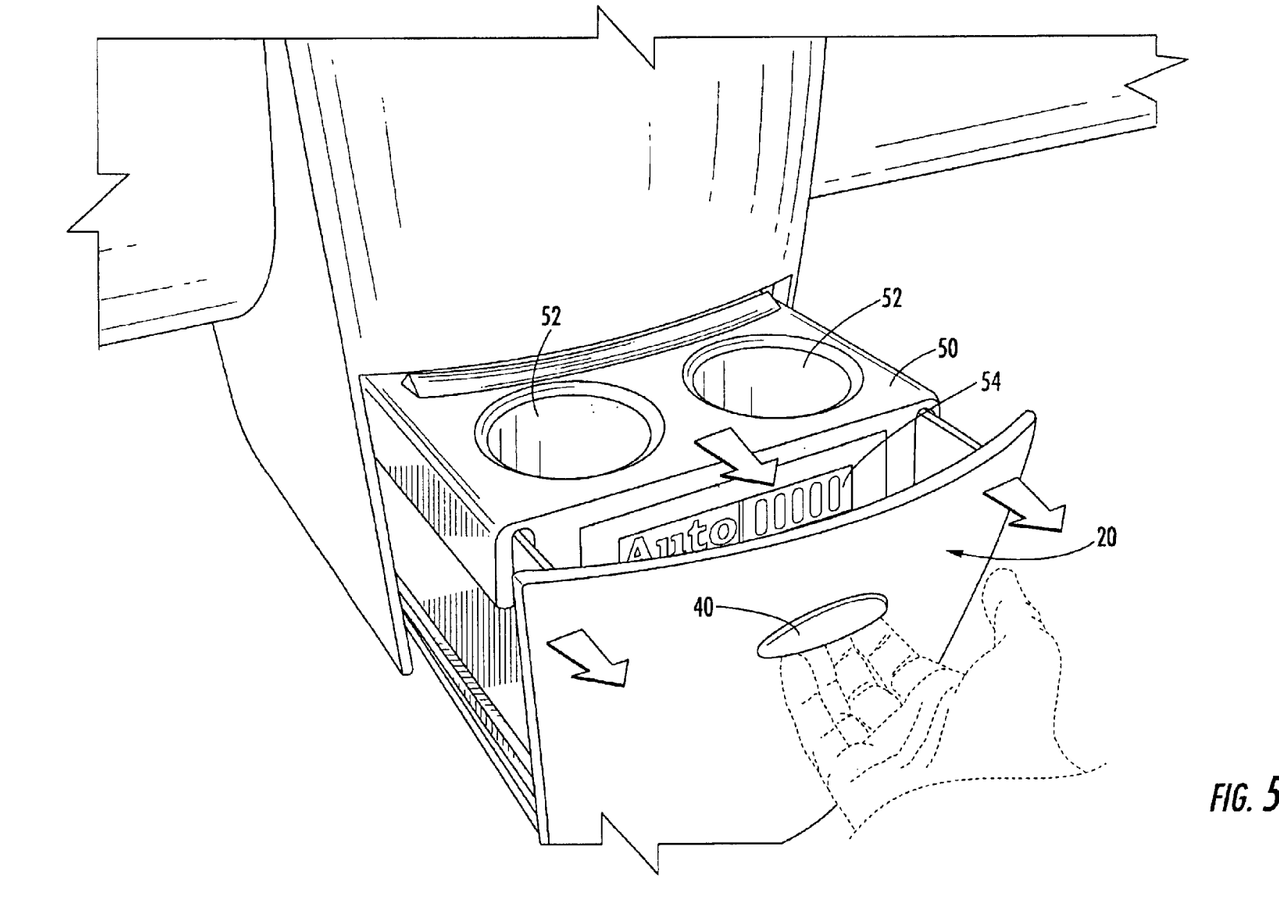
FIGS. 5–6 illustrate relative movement of the storage drawer and tray of FIG. 1 when the slider switch is in the "Auto" position.
Figure 6:
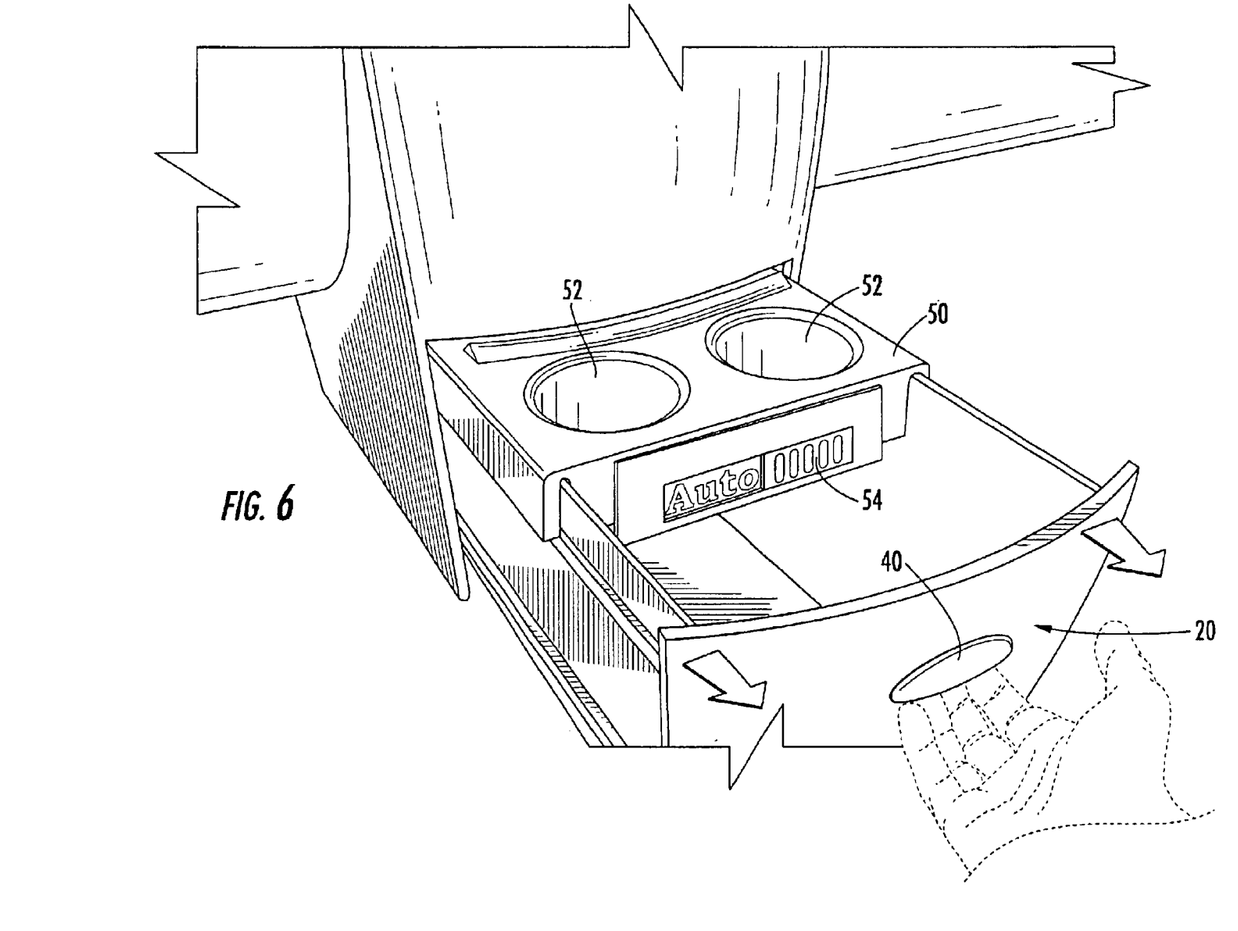
Figures 8A, 8B:
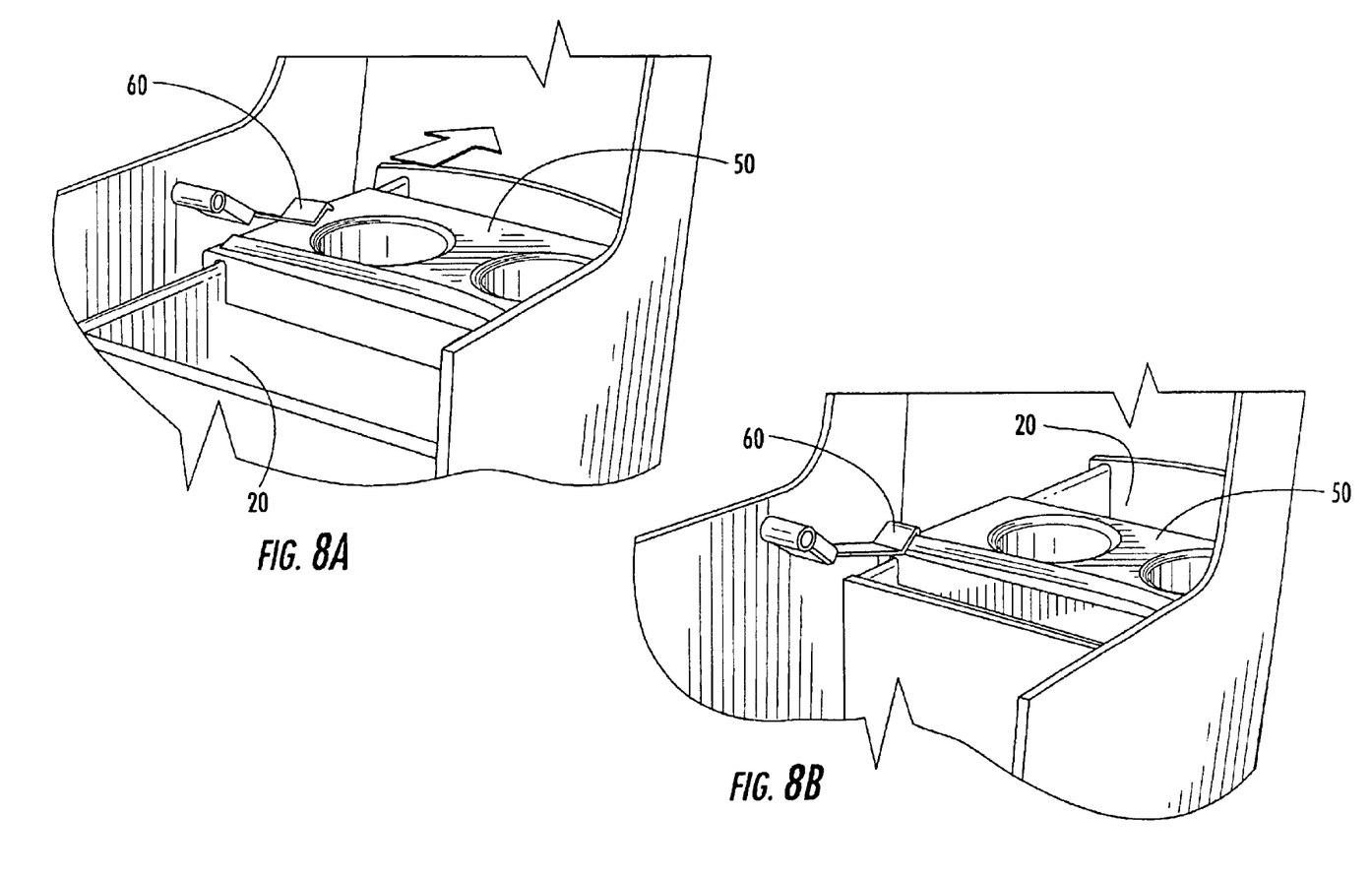
FIGS. 8A–8B illustrate how the tray of FIG. 1 is retained in an operative position when the slider switch of FIG. 4 is in the "Auto" position, according to an embodiment of the present invention.

FIG. 4 illustrates a user moving the slider switch 54 to the "Auto" position such that the tray is pulled automatically to its operative position upon movement of the drawer 20. As illustrated in FIG. 5, the tray 50 moves with the drawer 20 as the user pulls the drawer 20 open. When the tray 50 reaches its operative position, a stop 60 (FIGS. 8A–8B) holds the tray 50 in its operative position as the drawer 20 moves on to its fully open position (FIG. 6).

Figure 7A:
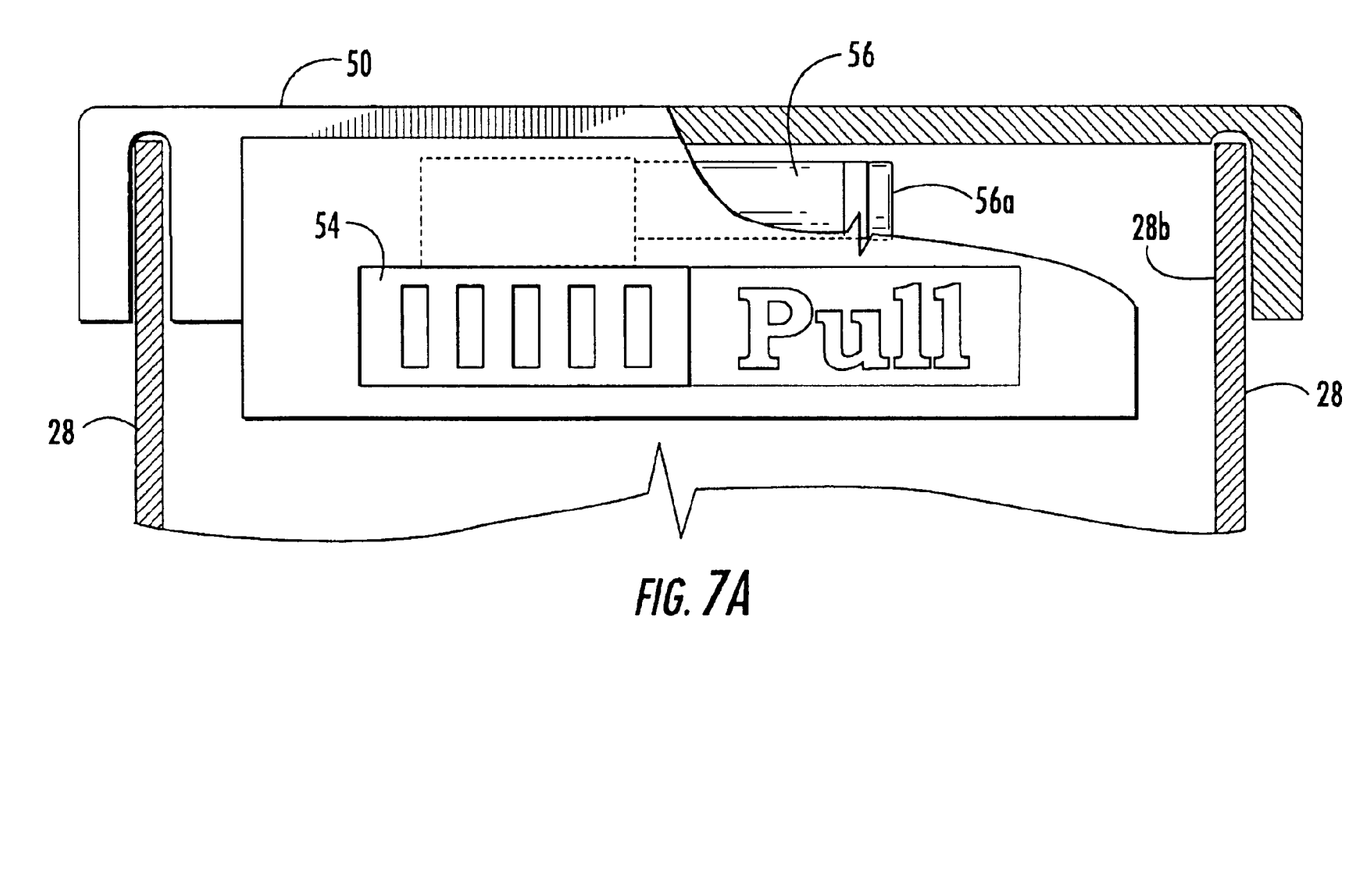
FIGS. 7A–7B illustrate how the tray is operably associated with the drawer when the slider switch is in the "Auto" position (FIG. 7B) and how the tray is not operably associated with the drawer when the slider switch is in the "Pull" position (FIG. 7A), according to an embodiment of the present invention.
Figure 7B:
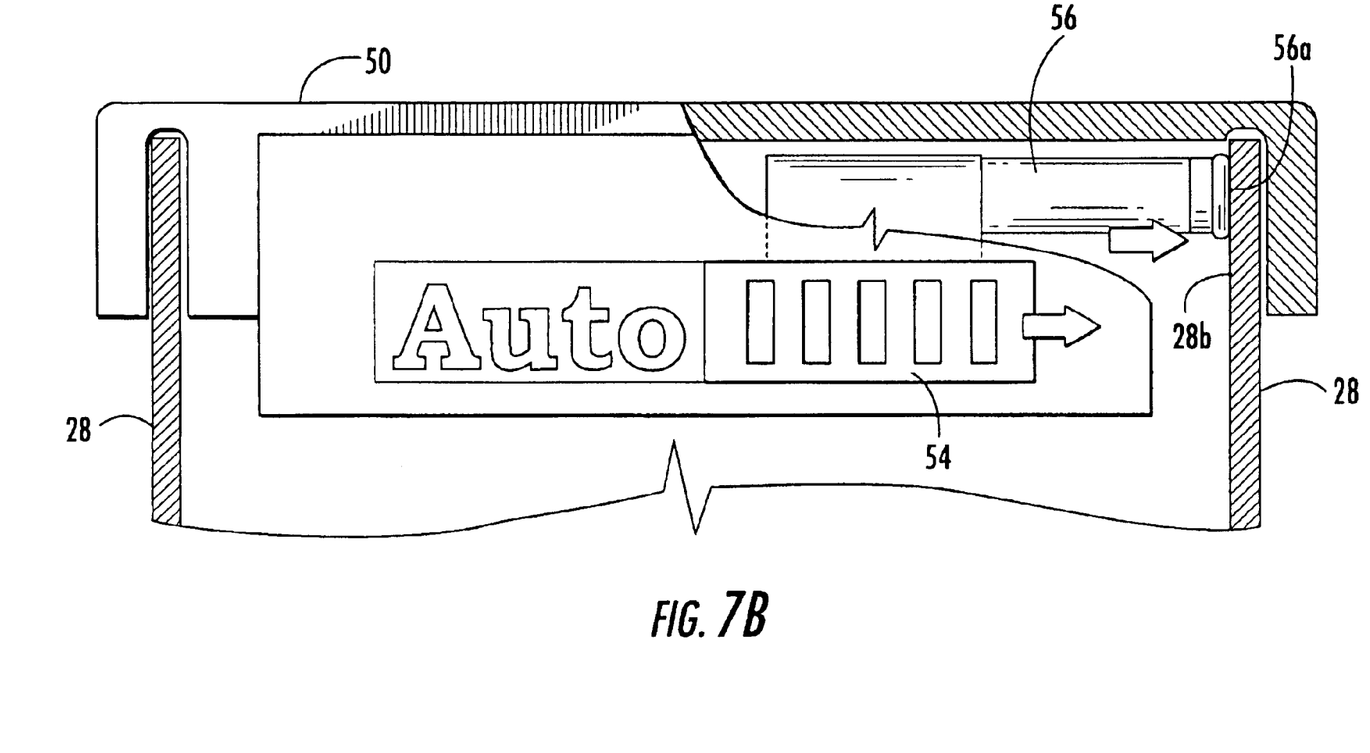

FIGS. 7A–7B and 8A–8B illustrate how the tray 50 is operably associated with the drawer 20 when the slider switch 54 is in the "Auto" position, according to an embodiment of the present invention. A member 56 is operably associated with the slider switch 54 and is configured to frictionally engage one of the side walls 28 of the storage drawer 20 when the slider switch 54 is in the "Auto" position. In the illustrated embodiment, the member 56 has a free end 56a that is configured to frictionally engage a surface 28b of drawer wall 28. The member 56 allows the tray 50 to be moved with the storage drawer 20 as it is moved to an open position. The member 56 may be operably associated with a spring or other biasing element to facilitate maintaining the member free end 56a in contact with wall surface 28b when slider switch 54 is in the "Auto" position (FIG. 7B).

The illustrated stop 60 (FIGS. 8A–8B) is configured to engage a portion of the tray 50 as the tray 50 moves with the storage drawer 20 and to overcome the friction force exerted by the member 56 so as to retain the tray 50 in its operative position.

Figure 10:
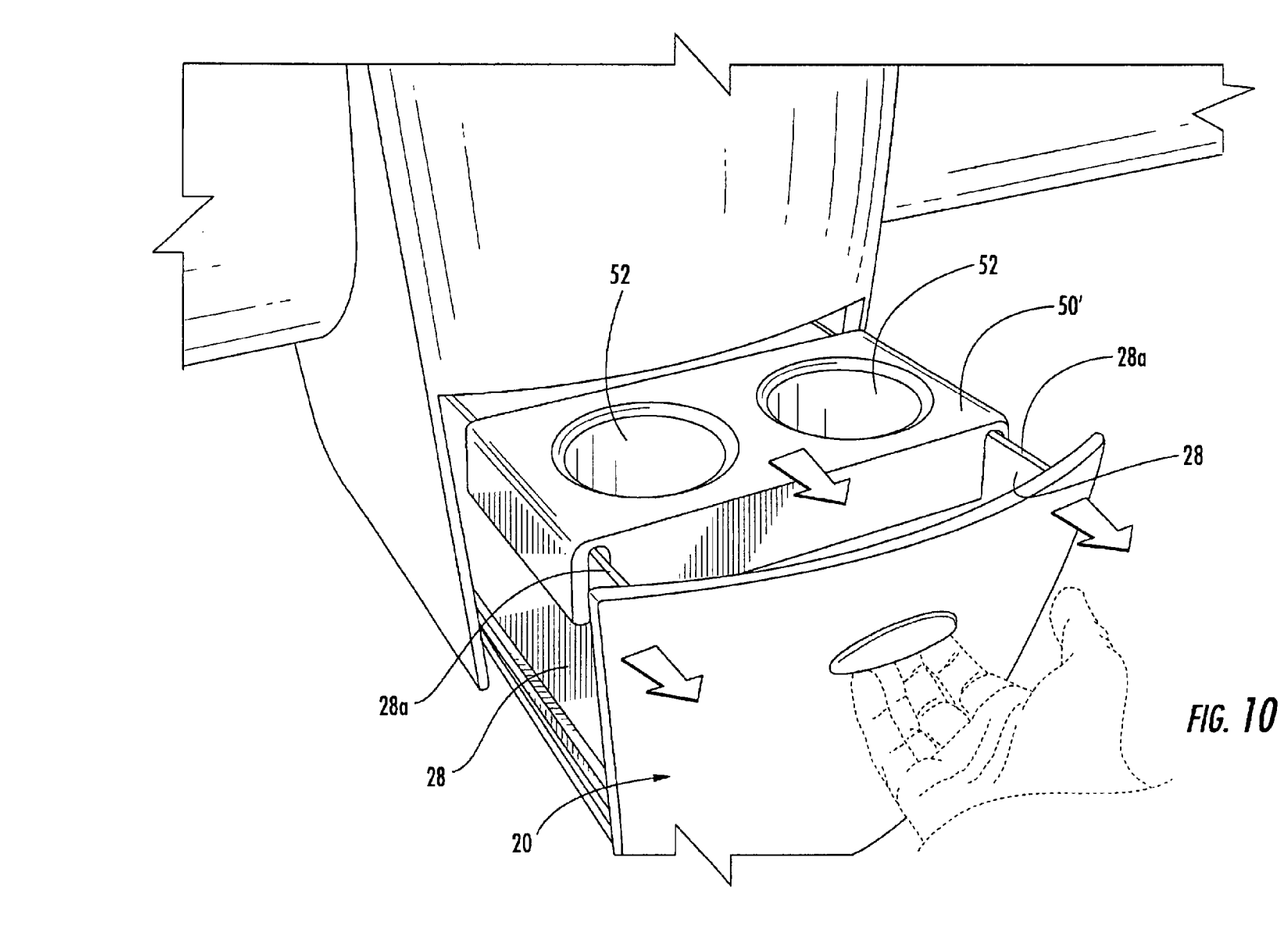
FIGS. 10–12 are perspective views of a driver-accessible slidable storage drawer according to another embodiment of the present invention.
Figure 11:
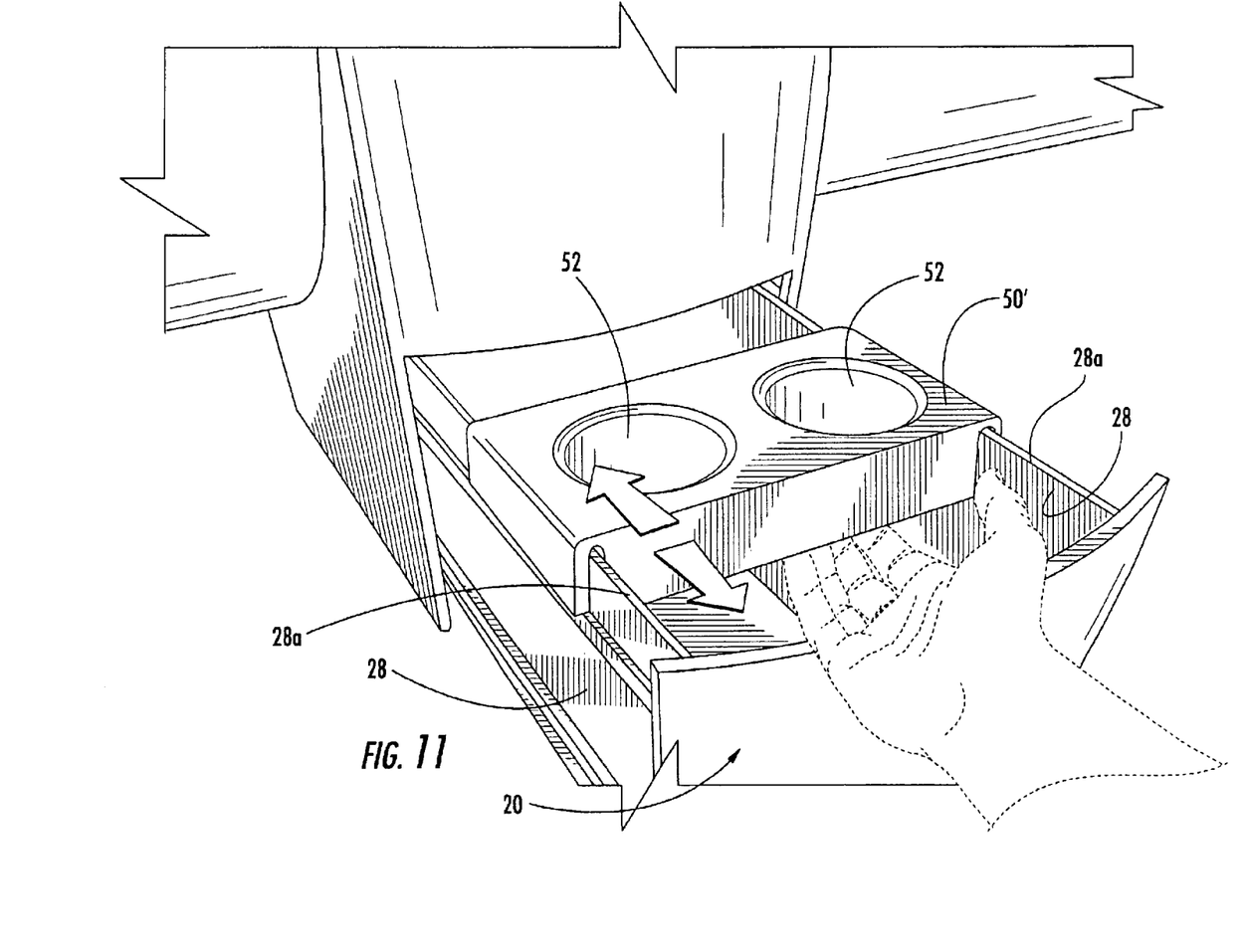

Embodiments of the present invention are not limited to the illustrated configuration of the slider switch 54, member 56, or stop 60. Various ways of operably associating the tray 50 with the drawer 20 for manual and automatic operation may be utilized, as would be understood by those skilled in the art. For example, embodiments of the present invention need not require a slider switch. As illustrated in FIGS. 10–11, a storage drawer 20 may include a tray 50' that slides along with the drawer 20 as the drawer is opened and closed. Because the tray 50' is slidably secured to the storage drawer 20, a user can move the tray 50' back and forth as desired, as illustrated in FIG. 11.

Figure 9A:
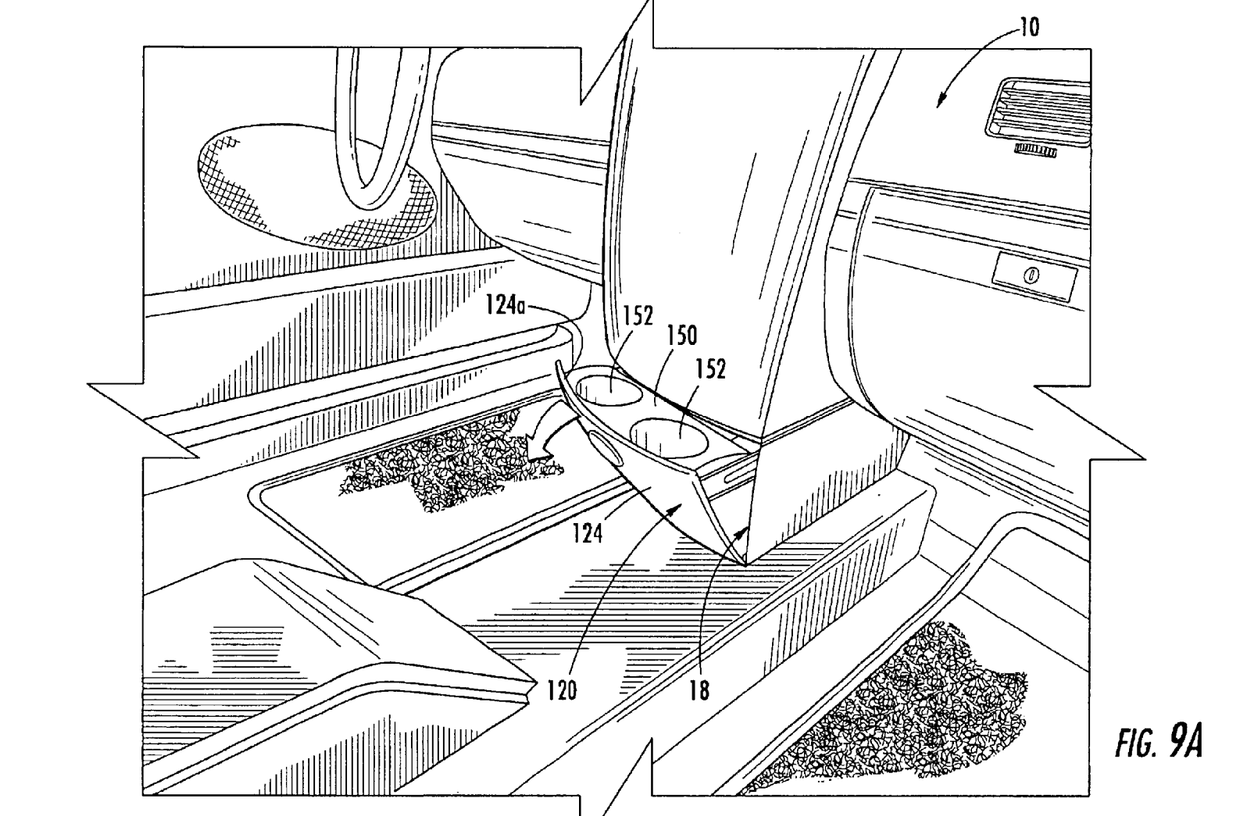
FIGS. 9A–9B are perspective views of a driver-accessible slidable storage drawer according to another embodiment of the present invention.
Figure 9B:
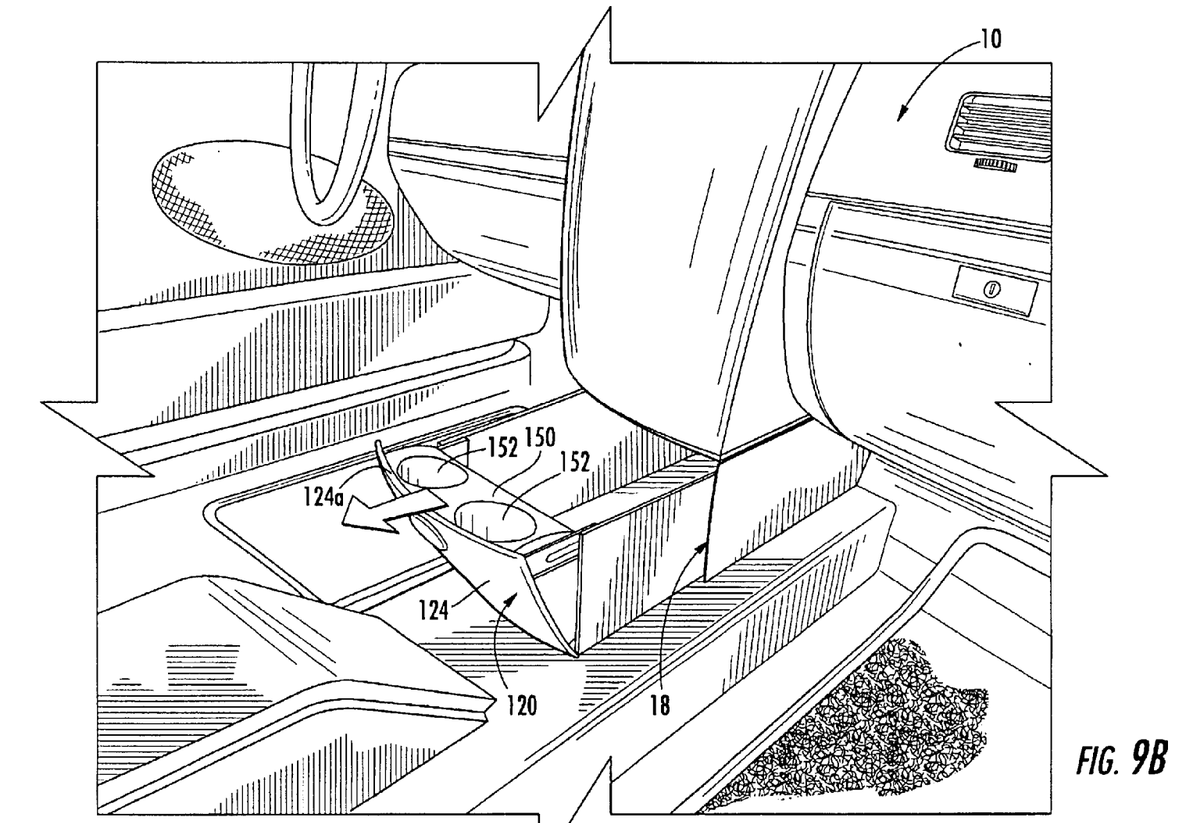

According to other embodiments of the present invention illustrated in FIGS. 9A–9B, a driver-accessible storage drawer 120 is movably secured to a vehicle instrument panel 10 and is movable within a cavity 18 of the instrument panel 10 between closed and open positions. The front wall 124 of the storage drawer 120 has an upper portion 124a that pivots outwardly to expose a tray 150. The illustrated tray 150 includes one or more receptacles 152 (e.g., cupholders, etc.) therein. The tray 50 is maintained in a position adjacent the front wall 124 of the storage drawer, even as the storage drawer 120 is moved to its fully open position (FIG. 9B).

Storage drawers according to embodiments of the present invention may be movably mounted within a vehicle passenger compartment for other types of relative movement. For example, a storage drawer may be pivotally mounted to rotate about an axis substantially normal to the vehicle floor. As such, a storage drawer can be rotated from a closed to reveal a storage compartment. However, various pivot axes may be utilized without limitation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A vehicle instrument panel, comprising:
a storage drawer slidably mounted to the instrument panel and movable within a cavity of the instrument panel between closed and open positions, wherein the drawer comprises a floor, a front wall, a rear wall opposite the front wall, and side walls that extend between the front and rear walls in spaced-apart relationship to define a storage compartment for receiving items therein; and
a tray slidably secured to the storage drawer and movable between a hidden position within the instrument panel cavity and en exposed position when the storage drawer is in an open position, wherein the tray comprises one or more receptacles for receiving items therein, and wherein the tray is operably connected to the storage drawer such that movement of the storage drawer from the closed position to a partially open position causes the tray to move to the exposed position.

2. The instrument panel of claim 1, further comprising a stop positioned within the instrument panel cavity, and wherein the stop maintains the tray in the exposed position as the storage drawer continues to move from the partially open position to a fully open position.

3. The instrument panel of claim 2, wherein the stop comprises a member that is configured to releasably grip a portion of the tray.

4. The instrument panel of claim 1, wherein the tray is configured to be selectively attached to the storage drawer such that movement of the storage drawer to a fully open position causes the tray to be moved to its exposed position.

5. A The instrument panel of claim 4, further comprising an actuator operably associated with the tray and that is movable between first and second positions, wherein, when the actuator is in the first position, user movement of the storage drawer to an extended position causes movement of the tray to the exposed position, and wherein, when the actuator is in the second position, movement of the tray is independent of user movement of the storage drawer.

6. The instrument panel of claim 5, wherein the actuator comprises a switch mounted on the tray.

7. The instrument panel of claim 1, wherein the storage drawer front wall comprises a front surface with a handle, and wherein the handle is configured to be grasped by a user to facilitate movement of the storage drawer between open and closed positions.

8. The instrument panel of claim 1, wherein the one or more receptacles are cup holders.

9. The instrument panel of claim 1, wherein the storage drawer front wall is substantially flush with a front portion of the instrument panel when the storage drawer is in the closed position.

10. The instrument panel of claim 1, wherein the storage drawer side walls include respective upper edge portions, and wherein the tray is slidably secured to the upper edge portions of the side walls.

11. The instrument panel of claim 1, wherein the storage drawer side walls include respective upper edge portions, and wherein the tray is removably secured to the upper edge portions of the side walls.

12. The instrument panel of claim 1, wherein the tray is removably secured to the storage drawer and can be removed from the storage drawer by a user.

13. A vehicle instrument panel, comprising:
a storage drawer slidably mounted to the instrument panel and movable within a cavity of the instrument panel between closed and open positions, wherein the drawer comprises a floor, a front wall, a rear wall opposite the front wall, and side walls that extend between the front and rear walls in spaced-apart relationship to define a storage compartment for receiving items therein; and
a tray slidably secured to the storage drawer and movable between a bidden position within the instrument panel cavity and an exposed position, wherein the tray comprises one or more receptacles for receiving items therein, wherein the tray is selectively connected to the storage drawer via a user-activatable actuator such that movement of the storage drawer from the closed position to a partially open position causes the tray to move to the exposed position.

14. The instrument panel of claim 13, further comprising a stop positioned within the instrument panel cavity, and wherein the stop maintains the tray in the exposed position as the storage drawer continues to move from the partially open position to a fully open position.

15. The instrument panel of claim 14, wherein the stop comprises a member that is configured to releasably grip a portion of the tray.

16. The instrument panel of claim 13, wherein the actuator is movable between first and second positions, wherein, when the actuator is in the first position, user movement of the storage drawer to an extended position causes movement of the tray to the exposed position, and wherein, when the actuator is in the second position, movement of the tray is independent of user movement of the storage drawer.

17. The instrument panel of claim 13, wherein the actuator comprises a switch mounted on the tray.

18. The instrument panel of claim 13, wherein the storage drawer front wall comprises a front surface with a handle, and wherein the handle is configured to be grasped by a user to facilitate movement of the storage drawer between open and closed positions.

19. The instrument panel of claim 13, wherein the one or more receptacles are cup holders.

20. The instrument panel of claim 13, wherein the storage drawer front wall is substantially flush with a front portion of the instrument panel when the storage drawer is in the closed position.

21. The instrument panel of claim 13, wherein the storage drawer side walls include respective upper edge portions, and wherein the tray is slidably secured to the upper edge portions of the side walls.

22. The instrument panel of claim 13, wherein the storage drawer side walls include respective upper edge portions, and wherein the tray is removably secured to the upper edge portions of the side walls.

23. The instrument panel of claim 13, wherein the tray is removably secured to the storage drawer and can be removed from the storage drawer by a user.

24. A vehicle instrument panel, comprising:
   a storage drawer slidably mounted to the instrument panel and movable within a cavity of the instrument panel between closed and open positions, wherein the drawer comprises a floor, a front wall, a rear wail opposite the front wall, and side walls that extend between the front and rear walls in spaced-apart relationship to define a storage compartment for receiving items therein; and
   a tray secured to the storage drawer adjacent the front wall, wherein the tray comprises one or more receptacles for receiving items therein;
   wherein the storage drawer front wall comprises an upper portion that pivots outwardly to expose the tray.

25. The instrument panel of claim 24, wherein the storage drawer front wall comprises a front surface with a handle, and wherein the handle is configured to be grasped by a user to facilitate movement of the storage drawer between open and closed positions.

26. The instrument panel of claim 24, wherein the one or more receptacles are cup holders.

27. The instrument panel of claim 24, wherein the storage drawer front wall is substantially flush with a front portion of the instrument panel when the storage drawer is in the closed position.

28. A vehicle instrument panel, comprising:
   a storage drawer slidably mounted to the instrument panel and movable within a cavity of the instrument panel between closed and open positions, wherein the drawer comprises a floor, a front wall, a rear wall opposite the front wall, and side walls that extend between the front and rear walls in spaced-apart relationship to define a storage compartment for receiving items therein, wherein the side walls have respective upper edge portions; and
   a tray slidably secured to the upper edge portions of the side walls and movable between a hidden position within the instrument panel cavity and an exposed position when the storage drawer is in an open position, wherein the tray comprises one or more receptacles for receiving items therein.

29. The instrument panel of claim 28, wherein the tray is operably connected to the storage drawer such that movement of the storage drawer from the closed position to a partially open position causes the tray to move to the exposed position.

30. The instrument panel of claim 29, further comprising a stop positioned within the instrument panel cavity, and wherein the stop maintains the tray in the exposed position as the storage drawer continues to move from the partially open position to a fully open position.

31. The instrument panel of claim 30, wherein the stop comprises a member that is configured to releasably grip a portion of the tray.

32. The instrument panel of claim 28, wherein the tray is configured to be selectively attached to the storage drawer such that movement of the storage drawer to a fully open position causes the tray to he moved to its exposed position.

33. The instrument panel of claim 32, further comprising an actuator operably associated with the tray and that is movable between first and second positions, wherein, when the actuator is in the first position, user movement of the storage drawer to an extended position causes movement of the tray to the exposed position, and wherein, when the actuator is in the second position, movement of the tray is independent of user movement of the storage drawer.

34. The instrument panel of claim 33, wherein the actuator comprises a switch mounted on the tray.

35. A vehicle instrument panel, comprising:
   a storage drawer slidably mounted to the instrument panel and movable within a cavity of the instrument panel between closed and open positions, wherein the drawer comprises a floor, a front wall, a rear wall opposite the front wall, and side walls that extend between the front and rear walls in spaced-apart relationship to define a storage compartment for receiving items therein, wherein the side walls have respective upper edge portions; and
   a tray removably and slidably secured to the storage drawer and movable between a hidden position within the instrument panel cavity and an exposed position when the storage drawer is in an open position wherein the tray comprises one or more receptacles for receiving items therein.

36. The instrument panel of claim 35, wherein the tray is operably connected to the storage drawer such that movement of the storage drawer from the closed position to a partially open position causes the tray to move to the exposed position.

37. The instrument panel of claim 36, further comprising a stop positioned within the instrument panel cavity, and wherein the stop maintains the tray in the exposed position as the storage drawer continues to move from the partially open position to a fully open position.

38. The instrument panel of claim 37, wherein the stop comprises a member that is configured to releasably grip a portion of the tray.

39. The instrument panel of claim 35, wherein the tray is configured to be selectively attached to the storage drawer such that movement of the storage drawer to a fully open position causes the tray to be moved to its exposed position.

40. The instrument panel of claim 39, further comprising an actuator operably associated with the tray and that is movable between first and second positions, wherein, when the actuator is in the first position, user movement of the storage drawer to an extended position causes movement of the tray to the exposed position, and wherein, when the actuator is in the second position, movement of the tray is independent of user movement of the storage drawer.

41. The instrument panel of claim 40, wherein the actuator comprises a switch mounted on the tray.

42. A vehicle instrument panel, comprising:
   a storage drawer slidably mounted to the instrument panel and movable within a cavity of the instrument panel between closed and open positions, wherein the drawer comprises a floor, a front wall, a rear wall opposite the front wall, and side walls that extend between the front and rear walls in spaced-apart relationship to define a storage compartment for receiving items therein; and
   a tray removably and slidably secured to the storage drawer and movable between a hidden position within the instrument panel cavity and an exposed position when the storage drawer is in an open position, wherein the tray comprises one or more receptacles for receiving items therein, and wherein the tray can be removed from the storage drawer by a user.

43. The instrument panel of claim 42, wherein the tray is operably connected to the storage drawer such that movement of the storage drawer from the closed position to a partially open position causes the tray to move to the exposed position.

44. The instrument panel of claim 43, further comprising a stop positioned within the instrument panel cavity, and wherein the stop maintains the tray in the exposed position as the storage drawer continues to move from the partially open position to a fully open position.

45. The instrument panel of claim 44, wherein the stop comprises a member that is configured to releasably grip a portion of the tray.

46. The instrument panel of claim 42, wherein the tray is configured to be selectively attached to the storage drawer such that movement of the storage drawer to a fully open position causes the tray to be moved to its exposed position.

47. The instrument panel of claim 46, further comprising an actuator operably associated with the tray and that is movable between first and second positions, wherein, when the actuator is in the first position, user movement of the storage drawer to an extended position causes movement of the tray to the exposed position, and wherein, when the actuator is in the second position, movement of the tray is independent of user movement of the storage drawer.

48. The instrument panel claim 47, wherein the actuator comprises a switch mounted on the tray.

* * * * *